United States Patent

[11] 3,599,986

[72] Inventor Itsuki Ban
829, Higashi-Oizumimachi, Nerima-ku, Tokyo-to, Japan

[21] Appl. No. 771,720
[22] Filed Oct. 30, 1968
[45] Patented Aug. 17, 1971
[32] Priority Oct. 28, 1967
[33] Japan
[31] 42/69004

[54] TAPE PLAYER UTILIZING PLURALITY OF ENDLESS MAGNETIC TAPE CARTRIDGES
10 Claims, 12 Drawing Figs.

[52] U.S. Cl. .......... 274/4 F
[51] Int. Cl. .......... G11b 5/00, G11b 23/06
[50] Field of Search .......... 340/174.1 C; 179/100.2 Z; 242/55.19, 198, 199, 200; 226/177, 178; 352/8; 123; 274/4, 11

[56] References Cited

UNITED STATES PATENTS

| | | | |
|---|---|---|---|
| 2,781,689 | 2/1957 | Heyer .......... | 242/55.19 |
| 3,127,178 | 3/1964 | Osborne et al. .......... | 179/100.2 |
| 3,134,089 | 5/1964 | Bogoff et al. .......... | 179/100.2 |
| 3,388,911 | 6/1968 | Wilson et al. .......... | 179/100.2 |
| 3,431,367 | 3/1969 | Nickl .......... | 179/100.2 |

*Primary Examiner*—Bernard Konick
*Assistant Examiner*—Robert S. Tupper
*Attorney*—Nathan M. Briskin

ABSTRACT: A tape player utilizing a plurality of endless magnetic tape cartridges comprising a container housing a plurality of endless magnetic tape cartridges therein, means for indexing the cartridge housed in the container and the sound track by depressing pushbutton rods whereby rotation of the container is controlled by said means to bring the preindexed cartridge into the play position while a magnetic head is caused to be moved to the preindexed soundtrack for its reproducing as desired so that the indexed cartridge and track are played in succession according to the programs.

INVENTOR

ITSUKI BAN

INVENTOR
ITSUKI BAN

INVENTOR

Itsuki Ban

INVENTOR

ITSUKI BAN

INVENTOR

ITSUKI BAN

INVENTOR

ITSUKI BAN

TAPE PLAYER UTILIZING PLURALITY OF ENDLESS MAGNETIC TAPE CARTRIDGES

BACKGROUND OF THE INVENTION

The present invention relates to a tape player utilizing a plurality of endless magnetic tape cartridges, more particularly, to such a tape player wherein a plurality of endless magnetic tape cartridges are housed in a rotatable container to automatically play the preindexed cartridge and sound track in succession.

A currently available tape player for endless magnetic tape cartridge is so adapted that a single-unit cartridge is inserted into the main body of the tape player for reproducing. However, it has been proposed to provide a tape player capable of housing a plurality of cartridges therein as in the case of a juke box. Many tape players utilizing a plurality of endless magnetic tape cartridges as proposed heretofore require a number of magnetic heads as many as the number of cartridges. Further, in such a tape player, a capstan is in the form of elongated shaft and lacks mechanical fidelity while a cartridge-shifting element for effecting engagement of the selected cartridge with the capstan is so bulky and complicated that it consumes much current.

In order to eliminate defects as above mentioned, a conception is proposed so that a plurality of cartridges are housed in a rotatable container and a single magnetic head is opposed to the cartridge in succession by controlling rotation of the container. According to this conception, it is not necessary to use an elongated capstan and such a capstan having mechanical fidelity may be used. Engagement of the capstan with the cartridge is effected by a simple structure without shifting the cartridges while depending upon movement of the capstan itself or the container.

It is important to a tape player utilizing a plurality of cartridges that indexing of the cartridge and sound track is readily established and the tape is played as programmed. This is possible when rotation of the container is controlled.

SUMMARY OF THE INVENTION

It is a principal object of the present invention to provide a tape player utilizing endless magnetic tape cartridges comprising a container housing a plurality of cartridges, a plurality of pushbutton rods rotatable in synchronism with the container and corresponding to each of the cartridges and soundtracks whereby the cartridge and soundtrack to be played are indexed by depressing the pushbutton rod and rotation of the cartridge and soundtrack-indexing member with the container is controlled by regulating engagement of the pushbutton rod with an arresting member.

A further object of the invention is to provide a tape player utilizing a plurality of endless magnetic tape cartridges wherein a tape driving and reproducing apparatus driven by rotation of a capstan is advanced toward the cartridge which is moved and positioned in the predetermined play position by rotation of a container, and tape feeding is effected by pressing a capstan against a pinch roller housed in the cartridge while a magnetic head with an end mark sensor is engaged by the tape so that the tape is played as desired.

Another object of the invention is to provide a tape player utilizing a plurality of endless magnetic tape cartridges wherein a tape driving and reproducing apparatus is magnetically attracted by an electromagnet to maintain abutment of a capstan with a pinch roller and tape reproduction is terminated by return of the tape driving and reproducing apparatus.

Still another object of the invention is to provide a tape player utilizing a plurality of endless magnetic tape cartridges, including a control circuit wherein a soundtrack is changed over by controlling the current supply of an electromagnetic plunger for soundtrack changeover means by means of a microswitch operated by a pushbutton rod engaging an arresting member and at the same time controlling current supply of an electromagnet for the tape driving and reproducing apparatus.

A still further object of the invention is to provide a tape player utilizing a plurality of endless magnetic tape cartridges, comprising a returning member for restoring a depressed pushbutton rod engaging an arresting member when an end mark sensor responds to the short circuit of a conductive foil as an end mark on the tape, whereby the pushbuttons corresponding to the cartridges and soundtracks are automatically returned upon termination of soundtrack reproduction so that the next depressed pushbutton rod can be engaged by an arresting member to cause the soundtrack corresponding to the respective pushbutton rod to be played.

A further object of the invention is to provide a tape player utilizing a plurality of endless magnetic tape cartridges wherein rotation of a container is made by rotating power of a capstan.

A further object of the invention is to provide a tape player utilizing a plurality of endless magnetic tape cartridges wherein a container slidably moves in an axial direction to be placed in the play position to allow the cartridge to be closed to a tape driving and reproducing apparatus so that abutment of a capstan with a pinch roller and engagement of a magnetic head with a magnetic tape are established.

For a better understanding of further objects and features of the invention, reference is made to the following detailed description of a preferred embodiment taken in conjunction with the accompanying drawings in which:

DESCRIPTION OF THE PREFERRED EMBODIMENTS

Figures 1, 2:
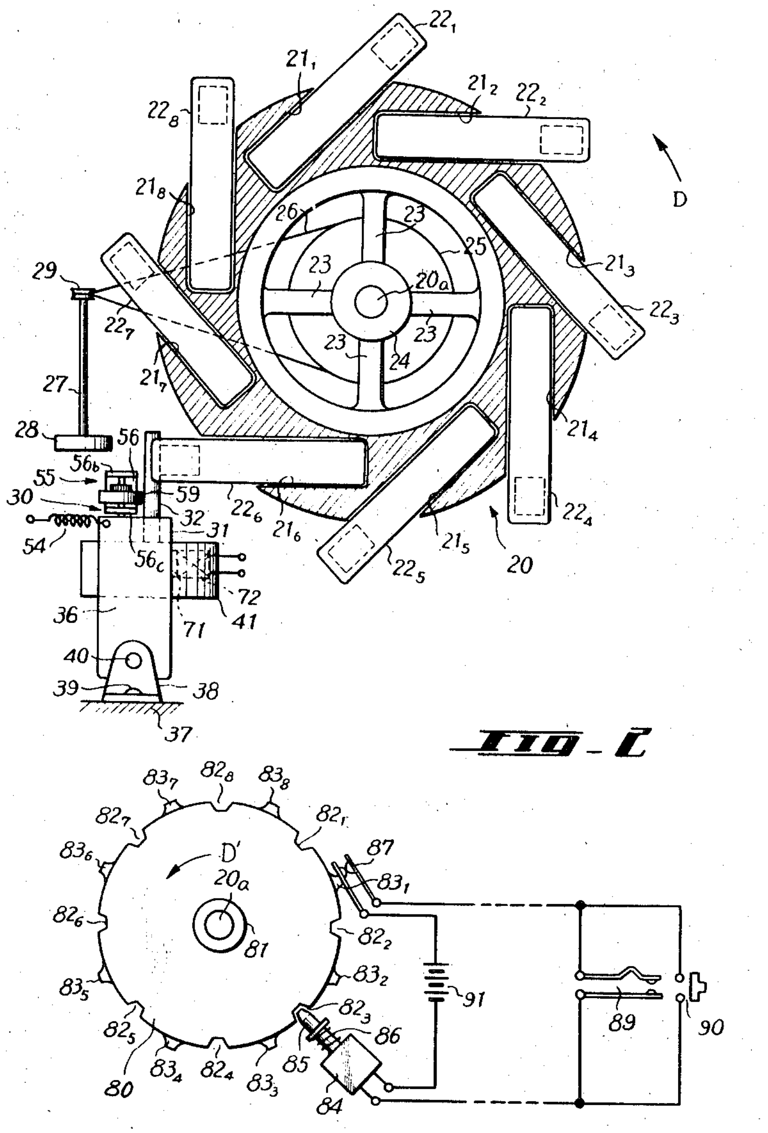
FIG. 1 is a side view showing a structure of a container and a tape driving and reproducing apparatus used in one form of a tape player according to the present invention with being partly broken away and omitted.
FIG. 2 is a representation of a mechanism for positioning one of endless magnetic tape cartridges housed in the container of FIG. 1 in the play position.

Referring to the drawing, particularly, FIG. 1, numeral 20 indicates a container having slots $21_1$, $21_2$, ...., $21_8$ into which a plurality of tape cartridges are inserted. Each of cartridges stores an endless magnetic tape which is reproduced by a tape player according to the present invention. The container 20 is in the form of a cylinder having a thick peripheral wall portion in which slots $21_1$, $21_2$, ...., $21_8$ are formed. Each slot is disposed in such a manner that the axis thereof is parallel to the diameter of the container, as shown, and having an equally spaced relationship. Tape cartridges $22_1$, $22_2$, ...., $22_8$ are inserted into the respective slots from the rear edge of the cartridges. Each slot is adapted to frictionally engage each of the cartridges therein. The leading edge of each cartridge extends from the periphery of the container 20 when inserted thereinto.

The container 20 has a sleeve 24 having arms 23, 23, .... and is rotatably supported through a horizontal shaft 20*a* secured to a main body (not shown) of the tape player according to the present invention. A drive mechanism of the container 20 comprises a pulley 25 integral with the sleeve 24, a belt 26, a pulley 29, a shaft 27 of the pulley 29, a roller 28, made of rubber or the like, which is pivoted to the shaft 27, and a capstan 32. The shaft 27 is rotatably supported in a bearing (not shown) and is adapted to be rotated by rotation of the capstan 32 in engagement with the roller 28 as hereinafter described.

The belt 26 extends around the pulley 25 and pulley 29 to rotate the same when the shaft 27 is rotated by the capstan 32. A tape driving and reproducing apparatus 30 includes a frame member 31, capstan 32, magnetic head 33, and an end mark sensor 34. The frame member 31 includes sideplates 36, 36 facing a top plate 35. The sideplates 36, 36 of the frame member 31 are pivoted by pins 40, 40 to brackets 38, 38 secured to a portion 37 of the main body of the tape player by a screw 39. The frame member 31 is swingable bilaterally centering around pins 40, 40. The capstan 32 mounted in a flywheel 41 extends above the top plate 35 through a hole bored therethrough. The flywheel 41 is supported in a bearing (not shown) in a spaced relationship with respect to the top plate 35. A motor (not shown) drives the flywheel through a belt. The magnetic head 33 is secured to the top end of a lever 42 of which the one end is supported through a pin 44 in brackets 43, 43 mounted on the top plate 35. Disposed within a space between the lever 42 and the top plate 35 are a ratchet wheel 46 mounted on a shaft 45 rotatably supported by a bearing (not shown), and a cam plate 47. One end of a detent 50 which is received through a pin (not shown) in a clevis part (not in particular shown) of one end of an armature 49 for an electromagnetic plunger 48 mounted on the top plate, engages each of the teeth of the ratchet wheel 46. The lever 42 is provided with a setscrew 51 and the one end of the lever is engaged with the periphery of the cam plate 47. A spring 52 wound to the pin 44 engages the brackets 43, 43 and the lever 42. The lever 42 is, therefore, urged by the spring 52 to cause the magnetic head 33 to approach the top plate 35.

The lever 42, ratchet wheel 46, cam plate 47, electromagnetic plunger 48, and the detent 50 constitute a conventional track or channel selection mechanism. The armature 49 is reciprocally moved to rotate the ratchet wheel tooth by tooth whenever the plunger 48 is energized. With rotation of the ratchet wheel 46, the cam plate 47 is rotated and the lever 42 is swung under control of the surface of the cam plate 47 to cause the position of the magnetic head 33 to be varied. The setscrew 51 is so adapted to be preset to prevent the magnetic head 33 from picking up two programs at a time. The end mark sensor 34 comprises a pair of contacts isolated from each other and is receiver in a mount 53 fixed to the top plate 35. The magnetic head 33, end mark sensor 34, and the capstan 32 are opposed to the leading edge of the tape cartridge $22_6$ (FIG. 1) placed in the play position after its selection and are settled with respect to their relation position above the top plate 35 to allow an endless tape 74 (FIG. 3) in the cartridge to be fed and played. The frame member 31 (FIG. 1) is counterclockwise urged by a spring 54 coupled to a portion of the main body of the tape player.

Figure 3A:
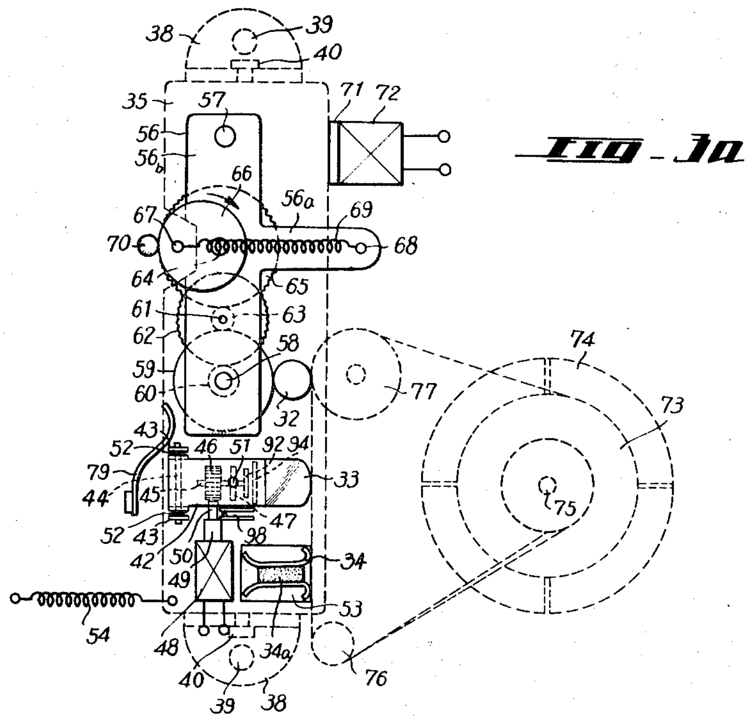
FIGS. 3*a* and 3*b* are diagrammatic plan views showing a relationship between the endless magnetic tape cartridge and the tape driving and reproducing apparatus with the same being enlarged.
Figure 3B:
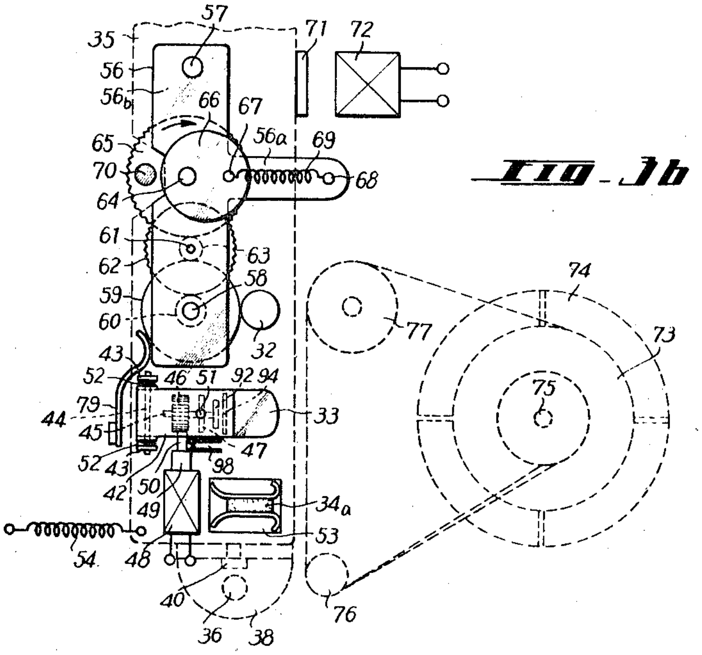

Numeral 55 in FIGS. 1 and 3A, 3B designates a driving mechanism for swinging the frame member 31 about the pins 40, 40. The driving mechanism comprises a frame member 56 rotatably mounted through a pivot 57 on the top plate 35 of the frame member 31, a rubber or the like made friction roller 59 mounted to a shaft 58 supported by a portion of the frame member 56, a gear 60 fixed to the shaft 58, a gear 62 mounted on a shaft 61 supported by a portion of the frame member 56 and engaging the gear 60, a gear 63 carried by the shaft 61, a gear 65 mounted on a shaft 64 supported by a portion of the frame member 56 and meshing with the gear 63, an eccentric cam 66 carried by the shaft 64, a spring 69 of which one end engages a pin 67 mounted on the face of the eccentric cam 66 and the other end engages a pin 68 mounted on the end of a lobe 56*a* of the frame member 56, and a stopper 70 mounted on a portion of the main body of the tape player. The frame member 56 includes an upper plate 56*b* and lower plate 56*c* spaced parallel with each other. These shafts 58, 61, and 64 are supported by the two plates 56*a* and 56*c*. The eccentric cam 66 has a different structure from that of the other parts on the frame member 56 and is mounted to the shaft 64 end projecting upwardly of the upper plate 56*b*. The friction roller 59 is placed in a position to pressedly engage the capstan 32. Thus, rotation of the capstan 32 is imparted to the friction roller 59 and is further imparted to the eccentric cam 66 through the gear train which includes gears 60, 62, 63, and 65. The stopper is provided opposed to the eccentric cam 66 and is engaged with the periphery of the cam 66. Accordingly, counterclockwise rotation of the frame member 31 is arrested by engagement of the eccentric cam 66 with the stopper 70. Since the frame member 31 is under control of the eccentric cam 66 and the stopper 70, when the cam 66 is rotated the member 31 is given a rotating power against the bias of the spring 54. In a position where the eccentric cam 66 is extremely biased, the frame member 31 is fully rotated against the urging force of the spring 54 to cause a mild steel plate 71 mounted on a portion of the frame member 31 to be close to the magnet open circuit of an electromagnet 72 fixed to the main body of the tape player. The electromagnet 72 is normally energized to attract and retain the mild steel plate 71 to be close together with the frame member 31. Since the mild steel plate 71 is opposed to the magnet open circuit of the electromagnet 72, once attraction is effected its attractive force is strong enough to retain the frame member 31 with a small current. During the period when the frame member 31 is attracted and retained by the electromagnet 72, the capstan 32, the magnetic head 33, and the end mark sensor 34 moves into the cartridge $22_6$ (see FIG. 1) from the window thereof.

The tape cartridge 22, as best shown in FIGS. 3A and 3B, includes a base (not shown), a reel rotatably mounted on an upstanding pin 75 disposed on the base, a guide 76 arranged in the base to lead a portion of the endless tape $73_6$received in the reel 74 to the leading edge of the cartridge, and a pinch roller 77 rotatably mounted on a shaft 78 fixed to the base. The capstan 32 which passes through the window of the leading edge of the cartridge $22_6$is pressed against the pinch roller $77_6$ to transport the tape $73_6$. The magnetic head 33 and the end mark sensor 34 are slidably engaged by the tape 73 when it is running. An end mark 78 (see FIG. 8) of aluminum foil is attached to a portion of the tape 73 to allow the contact of the end mark sensor 34 to be isolated from each other by an insulator 34*a* to be short circuited.

Numeral 79, indicated by FIGS. 3A and 3B, is a leaf spring of which one end is fixed to a portion of the main body of the tape player and the other one is in the proximity of the path of movement of the frame member 56. The spring 79 engages a portion of the frame member 56 to give abutment force to the friction roller 59 and the capstan 32 due to urging force of the spring 79 when the electromagnet 72 is deenergized to restore the frame member 31. Upon returning of the frame member 31, the capstan 32 abuts against the roller 28 to impart rotation force to the roller 28.

Figure 9:
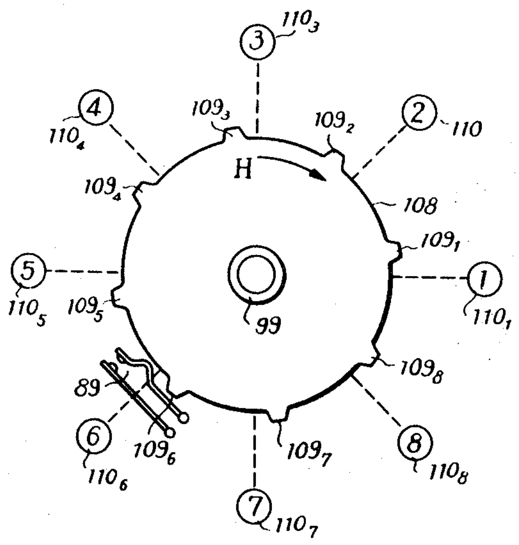
FIG. 9 is a representation showing a relationship between a disc rotatable with the index plate of FIG. 5 and an electrical contact.

FIG. 2 shows a mechanism for positioning one of endless tape cartridges by controlling rotation of the container 20. Numeral 80 designates a disc which is rotated synchronously the container 20 by centering the shaft 20*a* through a sleeve 81 coupled to the sleeve 24 of the container 20. The disc 80 is provided with eight bights $82_1$, $82_2$, .... $82_8$ equally spaced and projections $83_1$, $83_2$, .... $83_3$. One end of armature 85 of an electromagnetic plunger 84 secured to a portion of the main body of the tape player is opposed to the periphery of the disc 80. The armature 85 projects by the bias of the spring 86 to engage one of bights $82_1$, $82_2$, .... $82_8$ to thereby lock rotation of the disc 80 when the electromagnetic plunger 84 is deenergized. At the same time, rotation of the container 20 is locked to bring one of the tape cartridges into the play position. For instance, as shown in FIG. 1, if the armature 85 engages the bight $82_6$ to lock rotation of the container 20, the tape cartridge $22_6$ is brought into the play position. The electromagnetic plunger 84 is connected through contacts 87, 89 or a pushbutton switch 90 to a power source 91. The contact 87 is closed when it is in contact with the projections 83 of the disc 80. Thus, the contact 87 is normally closed by either one of the projections $83_1$, $83_2$, .... $83_8$ when the armature 85 is opposed to one of the bights $82_1$, $82_2$....$82_8$ . The contact 89, as shown in FIG. 9, will be described in details hereinafter. Whenever the contact 89 or the pushbutton switch 90 is closed, the electromagnetic plunger 84 is positively energized in the position where the armature 85 is opposed to the bight and the disc 80 is continuously rotated with the container upon disengaging the armature 85 from the bight. When the contact 89 or the pushbutton switch 90 is opened, the electromagnetic plunger 84 is deenergized to bring the armature 85 into either one of the bights to thus lock rotation of the disc 80 and to select the tape cartridge opposed to the bight in which the armature 85 is inserted whereby the cartridge is positioned in the play position to be opposed to the tape driving and reproducing apparatus 30. Rotation of the container 20 with the disc 80 is effected in the condition where the roller 28 abuts against the capstan 32. Upon termination of rotation of the container 20, the belt 26 slips with respect to the belt wheel 25 and wheel 29.

Figure 4:
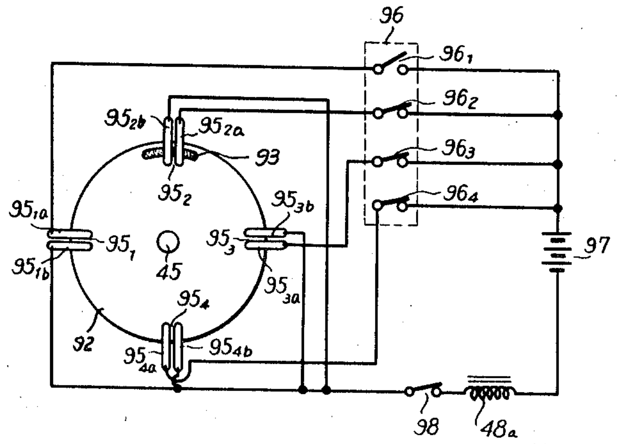
FIG. 4 is a circuit diagram for changing over the soundtrack.

FIG. 4 shows how to select the sound track and according to the embodiment, the tape consists of four tracks or four channels. Numeral 92 designates a rotary switch plate of an insulating material mounted on the shaft 45 coaxially with the cam plate 47. The rotary switch plate 92 is provided with a conductor portion 93 secured to the surface of the plate 92. An insulator plate 94 (see FIG. 3) is mounted on the top plate 35 (see FIG. 3) parallel to the rotary switchplate 92 and is provided with four contacts $95_1$, $95_2$, $95_3$, $95_4$ spaced quadrantly with each other. The contacts $95_1$, $95_2$, $95_3$, and $95_4$ comprises contactors ($95_{1a}$,$95_{1b}$), ($95_{2a}$, $95_{2b}$), ($95_{3a}$, $95_{3b}$), 1a , ($95_{4a}$, $95_{4b}$) spaced to each other. Each of the contactors slidably engages the surface of the rotary switch plate 92 and a short circuit is established between the contactors $95_{3a}$ and $95_{3b}$ or $95_{4a}$ and $95_{4b}$ to close the contacts $95_1$, $95_2$, $95_3$, and $95_4$. Switches $96_1$, $96_2$, $96_3$, and $96_4$ surrounded by dotted lines 96 form a track-selecting switch and the contactors $95_{1a}$, $95_{2a}$, $95_{3a}$, and $95_{4a}$ are connected through these switches to the plus terminal of the supply source 97. The contactors $95_{1b}$, $95_{2b}$, $95_{3b}$, and $95_{4b}$ each has a connection thereto and are connected through a switch and the exciting coil 48*a* of the electromagnetic plunger 48 (see FIG. 3) to the minus terminal of the power supply 97. The switch 98 is opened and closed by the armature 49 of the electromagnetic plunger 48, that is, it is opened when the armature 49 is attracted and is closed when the armature is restored. Accordingly, when all the switches $96_1$, $96_2$, $96_3$, and $96_4$ are closed, the armature 49 repeats reciprocal actuation such as attraction and return so that the cam plate 47 and rotary switch plate 92 are continuously rotated by an angle of 90°. On the contrary, when one of switches $96_1$, $96_2$, $96_3$, and $96_4$ is opened, the conductor portion 93 effects a short circuit between the contactors $95_{1a}$, $95_{1b}$ of the contact $95_1$ at which point the exciting coil 48*a* of the electromagnetic plunger 48 is deenergized to terminate rotation of the cam plate 47 and rotary switchplate 92 to thus select the sound track corresponding to the switch $96_1$.

Figure 5:
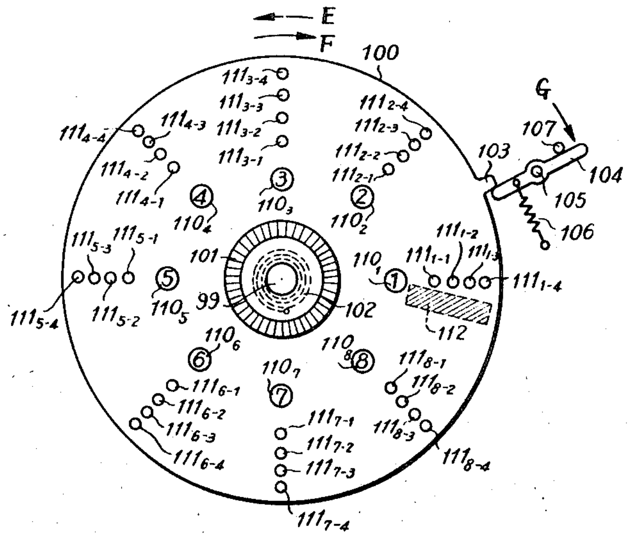
FIG. 5 is a representation of a cartridge and soundtrack indexing member.
Figure 6:
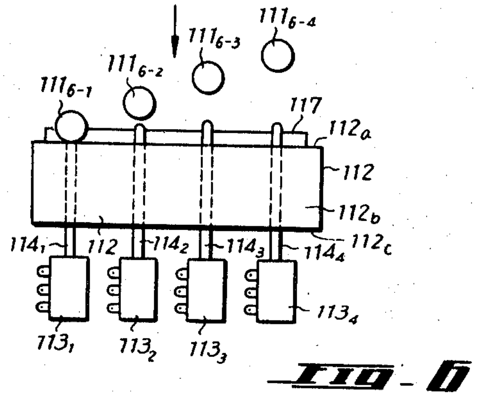
FIG. 6 is a diagrammatic representation showing a relationship between the pushbutton rods of FIG. 5 and an arresting member.
Figure 7:
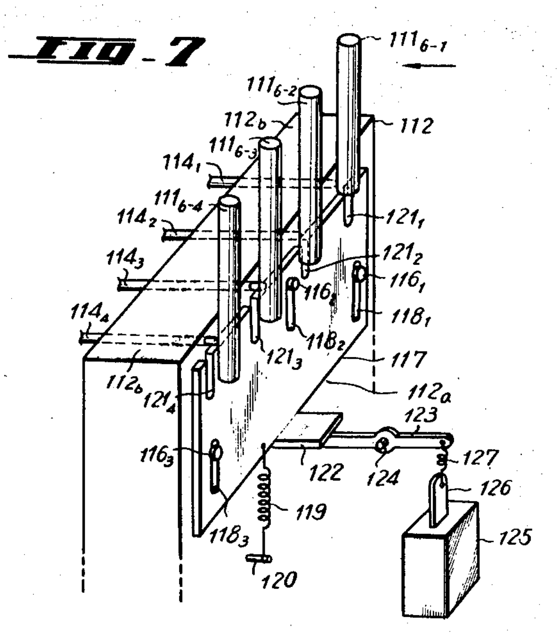
FIG. 7 is a perspective view of a returning member for the pushbutton rod.

A mechanism or arrangement shown in FIGS. 5, 6, and 7, is used for selection of the soundtrack. An index plate 100 for indexing the soundtrack is provided with a knob 101 and mounted on a shaft 99 rotatably supported by a bearing (not shown). The front of the plat 100 and the knob 101 is positioned to be opposed to an opening (not shown) formed in the main body of the tape player. The knob 101 is adapted to be capable of manual operation thereof. When the plate 100 is manually rotated through the knob 101 in the direction of arrow E, energy is stored in a spiral spring 102, indicated by the dotted lines, provided on a shaft 99. The index plate 100 is given a rotating power in the direction of arrow F by returning force of the spiral spring 102. Manual rotation of the index plate 100 is terminated in a position where energy is fully stored in the spiral sprint 102, the plate 100 is rotated in the direction of arrow F by returning force of the spiral spring 102, however, a boss 103 on the periphery of the plate is engaged by one end of a rotating lever 104 to terminate rotation of the plate 100 in the direction of arrow F. A rotating lever 104 is supported by a support shaft 105 at the midportion of the shaft and is counterclockwise urged by a spring 106. Rotation of the lever 104 is normally arrested by an arresting pin 107 mounted to be opposed to the opposite end of the lever. Rotation of the index plate 100 in the direction of arrow E, causes the boss 103 to engage the one end of the lever 104. In this case, the lever 104 is clockwise rotated by manual rotation of the index plate 100 and the boss 103 moves beyond the one end of the lever 104 so that rotation of the index plate 100 is not arrested. However, rotation of the plate 100 in the direction of arrow F establishes engagement of the boss 103 with the rotating lever 104. The other end of the lever 104 is depressed manually in the direction of arrow G against returning rotating force of the plate 100 and the spring 106 when rotation of the plate 100 is arrested by the lever 104, the lever 104 is clockwise rotated and the boss 103 moves beyond the end of the lever 104 and is rotatably returned in the direction of arrow F. The shaft 99 is provided with a conventional governor element (not shown) and is returned at a predetermined speed. A disc 108 (FIG. 9) having projections $109_1$, $109_2$, .... $109_8$ is secured to the shaft 99. When the disc 108 is rotated in the direction of arrow H by returning rotation of the shaft 99, the contact 89 is closed by the projections $109_1$, $109_2$, .... $109_8$. The contact 89 is for controlling current supply of the electromagnetic plunger 84 as described hereinbefore with reference to FIG. 2. Thus, when the disc 108 is rotated and the contact 89 is closed, the disc 80 (see FIG. 2) and the container 20 (see FIG. 1) are both rotated. Eight marks $110_1$, $110_2$, .... $110_8$ are provided on the plate 100 to correspond to the respective tape cartridges and comprises digits 1, 2, 3, .... 8. In association with each of these marks, there is radially arranged a four-piece set of pushbutton rods ($111_{1\text{-}1}$, $111_{1\text{-}2}$....), ($111_{2\text{-}1}$, $111_{2\text{-}2}$, ....), ...... ($111_{8\text{-}1}$, $111_{8\text{-}2}$, ....). These pushbutton rods are inserted into apertures (not shown) on the plate 100 by means of columns. When they are depressed from the front of the plate 100, they project from the rear side of the plate a certain extent and are frictionally retained. An arresting member 112 is secured to a portion of the main body of the tape player to be spaced from the plate 100. The relationship between the arresting member 112 and the pushbutton rod is shown in details in FIGS. 6 and 7. The arresting member 112 comprises a rectangular thick plate longer than the distance between the pushbutton rod $111_{6\text{-}1}$ and the pushbutton rod $111_{6\text{-}4}$ corresponding to the mark $110_6$. The front 112*a* of the member 112 id disposed diagonally of the row formed by the pushbutton rods $111_{6\text{-}1}$, $111_{6\text{-}2}$, .... $111_{6\text{-}4}$. A space is formed between the surface 112*b* of the arresting member 112 and the underside of the index plate 100 such that a depressed pushbutton rod can engage the front 112*a* of the arresting member 112. If only pushbuttons $111_{6\text{-}}$, $111_{6\text{-}2}$, $111_{6\text{-}3}$, $111_{6\text{-}4}$ are depressed whereas the other pushbuttons remain as they appear, the index plate 100 is rotated from the position in FIG. 5 and further rotated for its returning in the direction of arrow F. Rotation of the index plate 100 is maintained until the pushbutton rod $111_{6\text{-}1}$ engages the front $112_a$ of the arresting member 112. Such condition is shown in FIGS. 6 and 7.

Four of microswitches $113_1$, $113_2$, $113_3$, and $113_4$ are mounted on a portion of the main body of the tape player. Operating rods $114_1$, $114_2$, $114_3$, and $114_4$ for each switch are inserted in apertures bored from the rear surface 112*c* of the arresting member 112 through the front 112*a* and the ends of the operating rods 114 project from the front 112*a*. The ends $114_1$, $114_2$, .... $114_4$ of the microswitches $113_1$, $113_2$.... $113_4$ are depressed and operated by the pushbutton rods engaging the arresting member 112. In FIGS. 6 and 7, the operating rod $114_1$ is depressed by means of the pushbutton rod $111_{6-1}$ to effect a changeover of the microswitch $113_1$. Four pushbutton rods, for instance, the rods $111_{6-1}$, $111_{6-2}$.... $111_{6-4}$ are all depressed so the rod $111_{6-1}$ 197 is ahead of the others and engages the arresting member 112 to form a distance between the other pushbutton rods and the arresting member 112. As seen from the foregoing, only the operating rod $114_1$ is operated by pushbutton rod $111_{6-1}$ and the other rods are not operated.

Figure 8:
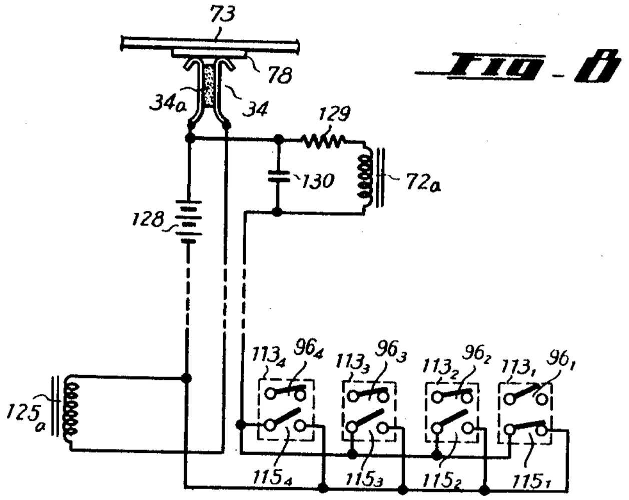
FIG. 8 is a circuit diagram for controlling current supply of an electromagnet magnetically attracting the tape driving and reproducing apparatus of FIG. 1 and of the electromagnetic plunger of FIG. 7.

The mocroswitches $113_1$, $113_2$, .... $113_4$, as shown in FIG. 8 are provided with each of two pairs of switches ($96_1$, $115_1$), ($96_2$, $115_2$), ($96_3$, $115_3$), ($96_4$, $115_4$) while the switches $96_1$, $96_2$, $96_3$, $96_4$ being the track-selecting switch 96 as described hereinbefore in FIG. 4. These switches $96_1$, $96_2$, $96_3$, $96_4$ are of the normally closed type whereas the switches $115_1$, $115_2$, $115_3$, $115_4$ are of the normally opened type. In FIG. 8, since the microswitch $113_1$ is operated, the switch $96_1$ is opened and the switch $115_1$ is closed. The operation of the switches $115_1$, $115_2$, $115_3$, $115_4$ will be described hereinafter. Guide pins $116_1$, $116_2$, $116_3$ and the sliding plate 117 vertically slidable through guide holes $118_1$, $119_2 118_3$ are provided on the front 112*a*. The sliding plate 117 is in the form of rectangular shape and a spring 119 extends between the sliding plate 117 and a pin 120 on the front 112*a* of the arresting member 112. The spring 119 urges the sliding plate downwardly. On the upper end of the sliding plate 117, there have been formed four notches $121_1$, $121_2$, $121_3$, $121_4$ formed corresponding to the pushbutton rods $114_1$, $114_2$, $114_3$, $114_4$. The sliding plate 117 is normally urged downwardly by the bias of the spring 119 and the upper end of plate 117 is normally positioned under the rear end of the pushbutton rod engaging the arresting member 112. A bend portion 122 is formed in the lower end of the sliding plate 117 and engages the end of the rotating lever 123 rotatable around the support shaft 124. The other end of the lever 123 is coupled through a spring 127 to an armature 126 of an electromagnetic plunger 125. An exciting coil 125*a* of the plunger 125 is connected, as shown in FIG. 8, through the end mark sensor 34 to a supply source 128. A short circuit is established by the end mark 78 on the tape 73 between the contacts of the sensor 34 to energize an electromagnetic plunger 125 to attract an armature 126. By attraction of the armature 126, the rotating lever 123 is clockwise rotated to slidably move through the bend portion 122 the sliding plate 117 against the bias of the spring 119.

Upon movement of the sliding plate 117, the rear end of the pushbutton rod $111_{6-1}$ engaging the holding member 112 returns by being pushed by the end of the sliding plate 117, thus disengaging the same. When the electromagnetic plunger 125 is deenergized, the sliding plate 117 returns again due to the action of the spring 119, and then the pushbutton rod $111_{6-2}$ engages the arresting member 112. Notches $121_1$, $121_2$, $121_3$ and $121_4$ serve to prevent the sliding plate 117, when it makes above vertical movement, from abutting against the operating rods $114_1$, .... $114_4$ of the microswitches $113_1$, .... $113_4$.

As shown in FIG. 8, the switch portions $115_1$, $115_2$, .... $115_4$ of the microswitches $113_1$, $113_2$, .... $113_4$ are in parallel and inserted between the coil 72*a* of the electromagnet 72 (FIGS. 1 and 3) and the current source. The resistor 129 connected in series with the coil 72*a* and the capacitor 130 connected in therewith serve to absorb the pulse current generated when the switch $115_1$ is opened and at the same time the next switch $115_2$ is closed, thereby stabilizing the attracting operation of the electromagnet 72.

The said designating plate 100 (FIG. 5) and the disc 108 (FIG. 9) are so relatively positioned that there is a slight phase difference between the indices $110_1$, $110_2$, .... $110_8$ and the projections $109_1$, $109_2$, .... $109_8$ respectively, the indices $110_1$, $110_2$, .... $110_8$ being in advance positions. In order to clarify this, the portions of the indices $110_1$, $110_2$, .... $110_8$ are indicated in FIG. 9.

The operation of the example of the present invention as shown in FIGS. 1 to 9 and described in detail above is as follows.

With the designating plate 100 prevented by the swing lever 104 from swinging due to the action of the coil spring 102 as shown in FIG. 5, all the switches $115_1$, $115_2$, $115_3$ and $115_4$ (FIG, 8) are open so that no current is supplied to the coil 72*a* of the electromagnet 72 so that the mild steel plate 71 arranged to the frame member 31 is not attracted by the electromagnet 72. Accordingly, the frame member 31 simply swings counterclockwise about the shaft 40, 40, under the control of the eccentric 66 which rotates by the power transmitted thereto from the capstan 32 through the friction roller 59 and a train of gears 60, 62, 63 and 65. When the frame member 31 swings counterclockwise, the roller 28 is pressed against the capstan 32 and the power of the capstan 32 is transmitted to the container 20. However, the armature 85 of the electromagnetic plunger 84 engages a bight of the disc 80 (FIG. 2) so that the disc 80 and the container 20 are in a locked stationary state.

When the swing or rotating lever 104 is swung in the direction of the arrow G through actuation of the pushbutton rod (not shown), the projection 103 is disengaged from the swing lever 104 so that the designating or index plate 100 starts to swing in the direction of the arrow F. If, at this time, only the pushbutton rods $111_{6-1}$, $111_{6-2}$, $111_{6-3}$ and $111_{6-4}$ are in depressed positions, then the designating plate 100 first rotates to such an extend that the pushbutton plate $111_{6-1}$ engages the arresting member 112. Together with this designating plate 100 the disc 108 (FIG. 9) rotates so that its projections $109_1$, $109_2$, $109_3$, $109_4$ and $109_5$ in turn close the electric contact 89. As a result, the electromagnetic plunger 84 is pulse energized by the current source 91 through electric contacts 89 and 87 so that the disc 80 is disengaged from the locked condition due to the action of the armature 85 and the disc 80 and the container 20 rotates in the directions of the arrows D′ and D, respectively. When the pushbutton rod $111_{6-1}$ engages the holding member 112, the designating plate 100 and the disc 108 are stopped and the electric contact 89 is kept open. Accordingly, current supply to the electromagnetic plunger 84 is stopped, the armature 85 engages the bight $82_6$ of the disc 80, and the disc 80 and the container 20 are stopped. This state is shown in FIGS. 1 and 2, and the tape cartridge $22_6$ is placed at the reproducing position. The pushbutton rod $111_6$ engaging the arresting member 112 at the same time operates the operating rod $114_1$ so that the switch $96_1$ is opened and the switch $115_1$ is closed, as shown in FIG. 8.

When, as shown in FIG. 4, the conductive portion 93 of the rotary switch plate 92 short circuits the contacts $95_{2a}$ and $95_{2b}$ of the switch $95_2$, and the electromagnetic plunger 48 (FIG. 3) is energized so that the armature 49 and the claw 50 are attracted. The subsequent opening of the electric contact 98 stops current supply to the electromagnetic plunger 48, and the armature 49 and the claw 50 are returned, the ratchet wheel 46, the cam plate 47 and the rotary switch plate 92 are rotated by 90°, and then the conductive portion 93 short circuits the switch $95_3$. The short circuit of the switch $95_3$ causes the electromagnetic plunger 48 to operate in a similar manner, and the ratchet wheel 46, the cam plate 47 and the rotary switch plate 92 are rotated by 90° and this time the switch $95_4$ is short circuited. This time also the electromagnetic plunger 48 operates similarly and the switch $95_1$ is short circuited. Although the switch $95_1$ is short circuited, since the switch $96_1$ is open as mentioned above, no current is supplied to the electromagnetic plunger 48 so that the cam plate 47 and the rotary switchplate 92 are not rotated. Then, under the control of the cam plate 47, the magnetic head 33 is placed to a position corresponding to the first recording track of the tape 73. Thus, engagement of the pushbutton rod $111_{6-1}$ with the arresting member 112 causes the sixth tape cartridge $22_6$ in the container 20 to be selected and brought to the reproducing position, and further, the first recording track of said cartridge is selected.

While the tape cartridge $22_6$ is brought to the reproducing position, the eccentric cam 66 is rotated under the action of the rotating power of the capstan 32 until it reaches the greatest shift point, the mild steel plate 71 is attracted to near the magnetic path open end of the electromagnet 72 and is engaged at that position, the electromagnet 72 being energized due to closure of the switch portion $115_1$ (FIG. 8) of the microswitch $113_1$. Then, the tape driving and reproducing apparatus 30 is in a state as shown in FIG. 3*a*. The eccentric cam 66, however, rotates further, so that, due to the action of the center over spring $69_1$ the eccentric cam 66 returns at one motion to the least shift position as shown in FIG. 3*b*. Upon this returning movement, the frame member 31 is already in its fixed state due to the attracting action of the electromagnet 72, so that there is scarcely no pressing contact of the stopper 70 and the eccentric cam 66 and the return operation is smoothly carried out. Also, after returning there is scarcely no pressing contact power of the capstan 32 and the friction roller 59 so that the eccentric cam 66 is stopped. With the frame member 30 attraction engaged by the electromagnet 72, the capstan 32, the magnetic head 33 and the end mark sensor 34 enter the cartridge through the window at the leading edge of the tape cartridge $22_6$ placed at the reproducing position, as shown in FIG. 3*a*, and the capstan 32 is brought into pressing contact with the pinch roller 77 with the magnetic tape 73 therebetween so that the tape is driven to run; the magnetic head 33 is brought into contact with the first recording track selected by the tape 73, and the end mark sensor 34 is also brought into contact with the tape 73. Thus, sound reproduction is started with respect to the first recording track of the tape cartridge $22_6$.

When the tape movement completes one cycle and finishes the sound reproduction with respect to the first recording track, and the end mark 78 arranged on the tape 73 short circuits across the contacts of the end mark sensor 34, as shown in FIG. 8, the electromagnetic plunger 125 (FIG. 7) is energized, the sliding plate 117 slides along the front surface 112*a* of the arresting member 112, and the pushbutton rod $111_{6\text{-}1}$ is returned. As a result, the microswitch $113_1$ is released from its actuated state, and the designating plate 100 rotates slightly. The next pushbutton rod $111_{6\text{-}2}$ engages the arresting member 112 and the designating plate 100 again stops. This time the microswitch $113_2$ is operated by the pushbutton rod $111_{6\text{-}2}$. When the microswitch $113_1$ is returned the switch $96_1$ is closed so that the electromagnetic plunger 48 is energized and the cam plate 47 and the rotary switch plate 92 are rotated by 90°. In this 90° rotated state, the electric contact $95_2$ is closed by the conductive portion 93. Since the switch $96_2$ is open by the action of the pushbutton rod $111_{6\text{-}2}$, the electromagnetic plunger 48 is not energized thereafter. Accordingly, under the control of the position occupied by the cam plate 77 corresponding to the switch $96_2$, the magnetic head 33 is brought to the position corresponding to the second recording track of the tape 73. Opening of the switch $115_1$ causes disconnection between the electromagnet 72 and the current source 128. However, after opening of the switch $115_1$ through the coil 72*a* of the electromagnet 72 then flows the discharge current of the period capacitor 130 as determined by the capacitor 130 and the resistor 129 (FIG. 8) so that the electromagnet 72 does not release the attracted and engaged frame member 31.

When the discharge current of the capacitor 130 thus attracts and keeps the frame member 31 engaged, the switch $115_2$ is closed by the pushbutton rod $111_{6\text{-}2}$ so that the electromagnet 72 is again supplied with current from the current source 128 and continues to attract and keep the frame member 31 engaged. Accordingly, this time by means of the pushbutton rod $111_{6\text{-}2}$, sound reproduction is made with respect to the second recording track of the designated tape cartridge $22_6$. Thus it will be understood that, when sound reproduction with respect to the second recording track is completed, the operation which is similar to that mentioned above is repeated and sound reproduction is made with respect to the third recording track, and, in the same manner, when the sound reproduction is completed with respect to the third recording track, the the sound reproduction will be started with respect to the fourth recording track. It will be further fully understood that, in case that previously only the pushbutton rods $111_{6\text{-}1}$ and $111_{6\text{-}4}$ are depressed, sound reproduction will be made with respect first to the first recording track and then to the fourth recording track.

When sound reproduction is completed with respect to the first, the second, the third and the fourth recording tracks, all the pushbutton rods $111_{6\text{-}1}$, $111_{6\text{-}3}$ and $111_{6\text{-}4}$ have returned so that the designating plate 100 starts to rotate again. Also, all the microswitches $113_1$, .... $113_4$ return so that the electromagnet 72 is deenergized so that the frame member 31 returns due to the action of the spring 54. Accordingly, the capstan 32, the magnetic head 34 and the end mark sensor 34 are separated from the tape cartridge $22_6$ and the reproduction is stopped, as shown in FIG. 3B. After all the pushbutton rods $111_{6\text{-}}$, ..... $111_{6\text{-}4}$ have returned, the designating plate 100 starts to rotate. For example, assume that the pushbutton rod $111_{7\text{-}2}$ is depressed, the designating plate 100 stops at the position where the pushbutton rod $111_{7\text{-}2}$ engages the arresting member 112. During the period before the designating plate 100 stops, the projection $109_6$ of the disc 108 causes the electric contact 89 to be closed once. Accordingly, the electromagnetic plunger 84 is once pulse energized, the disc 80 is disengaged and the disc 80 and the container 20 rotates at the same time. This rotation is stopped again through engagement of the armature 85 of the electromagnetic plunger 84 with the bight $82_7$. At this time, the seventh cartridge $22_7$ designated by the pushbutton rod $111_{7\text{-}2}$ is brought to the tape reproducing position. The pushbutton rod $111_{7\text{-}2}$ actuates the microswitch $113_2$ so that the magnetic head 33 is set to the position corresponding to the second recording track and the electromagnet 72 is kept energized. While the tape cartridge $22_7$ is brought to the reproducing position, since the front end of the leaf spring 79 abuts against the frame member 56, the friction roller 59 is weakly pressed against the capstan 32. Accordingly, the eccentric cam 66 rotates and after the elapse of some time comes into contact with the stopper bar 70, the frame member 31 swings against the action of the spring 54 and at the greatest shift point the frame member 31 is attracted and engaged by the electromagnet 72. Then, in a manner which is similar to that described above, the magnetic tape of the tape cartridge $22_7$ runs and sound reproduction is started with respect to the second recording track. When the movement of the magnetic tape completes its one cycle and the end mark 78 closes the end mark sensor 34, upon the operation of the electromagnetic plunger 125 the pushbutton rod $111_{7\text{-}2}$ returns, the microswitch $113_2$ returns, and the designating plate 100 is disengaged. Accordingly, the designating plate 100 rotates until the projection 103 engages the swing lever 104, and the frame member 31 returns due to the action of the spring 54.

Thus, depression of the pushbutton rod arranged to the designating plate 100 designates the one, to be used for sound reproduction, of a plurality of the tape cartridges in the container 20 and also the recording track with respect to which sound reproduction is to be made, thus automatically selecting the corresponding cartridge and recording track in turn and carrying out sound reproduction.

As will be understood from the above explanation, the container 20 rotates intermittently under the control of the action of the electromagnetic plunger 84 each time the electric contact 89 is closed by the projections $109_1$, $109_2$, .... $109_4$ of the disc 108 which rotates with the designating plate 100, so that it is necessary that the rotating speed of the container 20 is greater than that of the designating plate 100. The time duration from the release of the tape driving and reproducing apparatus 30 from the attraction engagement by the electromagnet 72 to the next attraction engagement of said arrangement 30 depends upon the rotating speed of the eccentric cam 66. It is necessary that this time duration is greater than the time duration from the completion of reproduction with respect to one cartridge to the selection of the next cartridge.

In the illustrated example, the container 20 and the disc 108 are separated. However, these may be formed into a unitary structure, and, also, the designating plate 100 and the disc 108 may be formed into a unitary structure.

The pushbutton switch 90 as shown in FIG. 4 is provided for the purpose of rotating the container 20 as desired.

In the event that, during sound reproduction, the current supply is inadvertently stopped or power failure occurs, then in the example of the present invention current supply to the electromagnet 72 is stopped and the frame member 31 is automatically returned due to the action of the spring 54, so that it is possible to fully prevent deformation of the pinch roller due to pressing contact for a long time of the pinch roller and the capstan and also to prevent such accident that the magnetic tape is damaged through entanglement, or adhesion of the pinch roller, of the magnetic tape.

In the illustrated example, the capstan 32 is driven by a motor (not shown) through a flywheel 41. It is possible to eliminate the flywheel 41 by using an electronic motor whose rotation shaft serves as the capstan.

In the above mentioned example, a container is used which stores a plurality of tape cartridges in such manner that the leading edges of these cartridges project beyond the peripheral surface of the container. Also, another type of container may be used which stores the cartridges in such a manner that said leading edges project from one side surface of the container. In this case, the container is made slidable along the shaft supporting it. This axial sliding movement of the container causes the cartridge to move toward and away from the tape driving and reproducing apparatus, thus carrying out sound reproduction and tape stoppage. The rotating power of the capstan may be utilized, in a manner which is similar to that of the above-mentioned example, for the axial sliding movement of the container.

Figure 10:
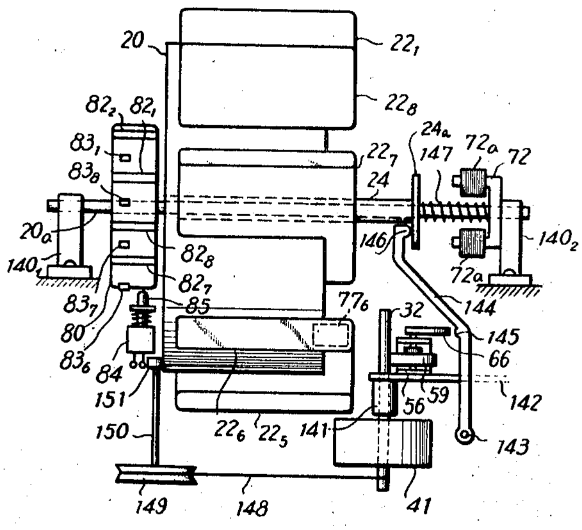
FIG. 10 is a side view showing another form of a container used in the tape player.
Figure 11:
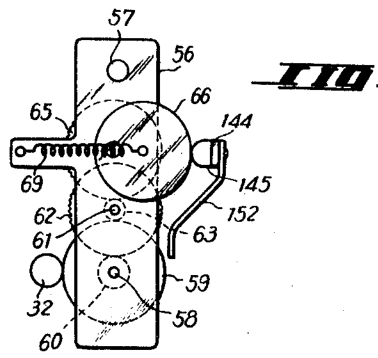
FIG. 11 is a plan view showing a driving mechanism for the rotatable lever of FIG. 10.

In FIGS. 10 and 11 there is shown an example which performs sound reproduction and tape stoppage by means of axial sliding movement of the container. In FIGS. 10 and 11 the same numeral is utilized for any corresponding member which performs the same action as that in the above mentioned example, so that the reader may readily understand the structure and the function thereof. In FIG. 10 the bearings $140_1$ and $140_2$ fixed to the main body rotatably support the shaft 20a to which is fixed the disc 80, and the container 20 is arranged through a sleeve 24. The sleeve 24 rotates synchronously with the shaft 20a and also is freely slidable along the shaft 20a. On the peripheral surface of the disc 80 are formed the bights $82_1$, $82_2$, .... $82_8$ and the projections $83_1$, $83_2$, .... $83_8$. Opposite to the peripheral surface of the disc 80 there is arranged an electromagnetic plunger 84. The member corresponding to the electric contact 87 (FIG. 2) to be closed by the projections $83_1$, $83_2$, .... is not shown. The capstan 32 and the flywheel 41 are arranged on the deck 142 through the bearing 141. On the deck 142 there is arranged a device for moving the container 20 to the left and the right on the drawing. Of this device there is shown only a portion thereof, namely the friction roller 59, the frame member 56 and the eccentric cam 66. The swing lever 144 is so supported as to swing about the supporting pin 143 and one portion 145 of the swing lever 144 slidably contacts the eccentric cam 66, and the front end portion thereof 146 abuts against the flange 24a fixed to the sleeve 24. Accordingly, due to the rotation of the eccentric cam 66 the swing lever 144 swing to the left and right on the drawing, and causes, through the flange 24a, the container 20 to slide and move to the right against the action of the spring 147, then the pinch roller $77_6$ stored in the cartridge $22_6$ is pressed against the capstan 32 and sound reproduction is started.

At this time, the flange 24a formed of a mild steel disc moves near to the magnetic path open end of the yoke of the electromagnet 72 whose coils 72a, 72a are energized so that it is strongly attracted and engaged. Accordingly, when current supply to the coil 72a is stopped the swing lever 144 is returned by spring 147 and flange 24a. The frame member 56 is rotatably arranged to the supporting shaft 57 fixed to the deck 142, and the friction roller 59 is supported by the supporting shaft 58, and the rotating power of the friction roller 59 is transmitted through the gears 60, 62, 63 and 65 to the eccentric cam 66, the speed being reduced. The eccentric cam 66 as shown in solid lines in the drawing is at the greatest shift point so that the swing lever 144 is pushed to the right and the container 20 to the left, the container 20 moves to the position as illustrated due to the action of the spring 147. In this state, the rotating power of the capstan 32 is transmitted through the belt 148, the belt wheel 149, the rotating shaft 150 and the friction roller 151 to the container 20 so that the container 20 rotates and cartridge selection is carried out in the same manner as the above example.

FIG. 11 shows an arrangement for controlling the action of the rotating lever 144. The frame member 56 is rotatably arranged to the supporting shaft 57 fixed to the deck 142, and the friction roller 59 is supported by the supporting shaft 58, and the rotating power of the friction roller 59 is transmitted through the gears 60, 62, 63 and 65 to the eccentric cam 66, the speed thus being reduced. The eccentric cam 66 as shown in the solid lines in the drawing is at the greatest shift point so that the rotating lever 144 is pushed to the right and the container 20 is through the flange 24a attracted and engaged by the electromagnet 72. Upon further rotation of the eccentric cam 66, the center over spring 69 causes the eccentric cam 66 to be rotated by 180° so as to bring it to the position as shown in dotted lines. Then, since the rotating or swing lever 144 exerts no pressing contact power, the eccentric cam 66 is free to rotate. Also, there is no pressing contact power between the capstan 32 and the friction roller 59 so that the rotating power of the capstan 32 is not transmitted to the roller 59.

Then, when the container 20 is released from the attraction engagement by the electromagnet 72, the rotating lever 144 moves with the container 20 toward the frame member 56. The weak leaf spring 152 fixed at one end thereof to the swing lever 144 weakly presses the frame member 56, so that the capstan 32 and the friction roller 59 slightly press each other and the eccentric cam 66 starts to rotate. After the lapse of some time the eccentric cam 66 abuts against the swing lever 144, and the resulting reaction causes the capstan 32 and the friction roller 59 to fully press each other so that the capstan power is strongly transmitted to the eccentric cam 66 and causes the container 20 to slide to the play position. Thus, an operation which is similar to the aforementioned example is carried out. Selection of the cartridges and sound tracks can be also similarly carried out according to the aforementioned example as shown in FIGS. 4, 5, 6, 7, 8 and 9.

With the arrangement of the present invention, as described in detail hereinbefore, it is possible to carry out cartridge indexing or designation and sound reproduction through remote control, for example, by arranging the container storing a plurality of the tape cartridges and the tape driving and reproducing apparatus in the common housing, and the cartridge and recording-track-selecting arrangement in another housing, and extending the wiring as shown in dotted lines in FIGS. 2 and 8.

While detailed description has been made above in conjunction with the illustrated examples, it is to be understood that the present invention is not restricted by the illustrated examples and various modification or improvement can be made within the scope of the appended claims.

What I claim is:

1. A tape player utilizing a plurality of cartridges each containing a pinch roller and an endless magnetic tape, in which the desired cartridge and soundtrack are indexed by depressing a pushbutton rod and in which selected cartridges are successively played, comprising: a rotatable container for housing a plurality of the cartridges; means for rotating said container; cartridge-selecting means including an armature, a first electromagnetic plunger for operating said armature, a disc rotatable in synchronism with said container having a plurality of engaging portions corresponding to the cartridges housed in said container, said armature being positioned to engage one of said engaging portions to terminate rotation of the container and bring the cartridge associated with said engaged engaging portion into a predetermined play position; a pivotally movable tape driving and reproducing deck, said deck being normally urged to a first position where said deck is remote from a cartridge in the play position, a capstan, a magnetic head, and an end mark sensor mounted on said deck, means for moving said deck to a second position adjacent to a cartridge in the play position, and an electromagnet arranged remote from said deck and adapted to magnetically attract said deck and move said deck into a third position where the capstan abuts against the pinch roller in a cartridge positioned in the play position and the magnetic head and the end mark sensor are slidably engaged by the tape therein, said deck driving means including cam means for moving the deck to the second position through rotation of said capstan and being adapted to be actuated when said deck is in the first position; soundtrack changeover means for selectively vertically moving said magnetic head to the desired one of a plurality of sound tracks on said magnetic tape, including a second armature, a second electromagnetic plunger for moving said second armature, a cam plate adapted to be rotatably driven in response to movement of the armature of the second electromagnetic plunger; cartridge and soundtrack-indexing means including a rotatable index plate , means for rotating said index plate, and a plurality of groups of pushbutton rods mounted on said index plate, each group corresponding to one of the plurality of cartridges housed in said container and the number of pushbutton rods in each group corresponding to the number of soundtracks on a tape in a cartridge, each of said pushbutton rods being independently slidable between a normal raised position and a depressed indexing position, an electrical contact adapted to be operatively opened and closed synchronously with rotation of said index plate, the first electromagnetic plunger being adapted to be energized and controlled in response to opening or closing of said electrical contact, whereby said container is rotated synchronously with rotation of said index plate; pushbutton-rod-returning means including an arresting member provided in the path of rotation of a depressed pushbutton rod for arresting rotation of the index plate by engagement by said arresting member and a depressed pushbutton rod, a third electromagnetic plunger, a pushbutton-rod-returning member for moving a depressed pushbutton rod engaged with said arresting member out of engagement therewith and to return said depressed rod to its normal raised position, said pushbutton-rod-return member being actuated by said third electromagnetic plunger when said third electromagnetic plunger is energized, and said third electromagnetic plunger being adapted to be energized in response to detection of an end mark on the magnetic tape by said end mark sensor; a control circuit for controlling current supply to the electromagnet of said tape driving and reproducing apparatus and to the second electromagnetic plunger including a group of switches operable by a depressed pushbutton rod engaging and being disengaged from said arresting member, said means for rotating said container and said means for rotating said index plate being operable independent of said pushbutton rod return means.

2. A tape player utilizing a plurality of endless magnetic tape cartridges according to claim 1, wherein said means for driving said tape driving and reproducing deck comprises a frame member pivoted to said deck, a friction roller rotatably supported by said frame member and being adapted to engage the capstan, a rotatable cam, a gear train between said cam and said roller for imparting rotation of the roller to the cam, a stationary stopper mounted adjacent said cam, a spring urging said deck to said first position, a center over spring having urging force for moving the cam to a minimum biased position, and a leaf spring urging the frame member in a direction such that the friction roller abuts against the capstan, whereby the deck is swung to said second position due to abutment of the cam with the stopper and said deck is attracted in the proximity of the maximum biased position of the cam, thereafter the cam is moved to the minimum biased position under the action of said over center spring, and said deck is returned to the first position by urging force of the spring upon deenergization of the electromagnet.

3. A tape player utilizing a plurality of endless magnetic tape cartridges according to claim 1, wherein the index plate of said cartridge and soundtrack-indexing means is manually rotatable, and said means for rotating said index plate is a coil spring for storing energy imparted to the spring by manual rotation of said index plate.

4. A tape player utilizing a plurality of endless magnetic tape cartridges set forth in claim 1 wherein each group of the pushbutton rods of said cartridge and soundtrack-indexing means is diagonally arranged with respect to the arresting member and only one of the depressed pushbutton rods is normally engaged with said arresting member at one time.

5. A tape player utilizing a plurality of endless magnetic tape cartridges set forth in claim 1 wherein said container, said means for rotating said container, said cartridge-selecting means, said tape driving and reproducing deck, and said soundtrack changeover means are housed in a common housing, while said cartridge and soundtrack-indexing means, said pushbutton-rod-returning means, and said control circuit are stored in a separate housing, whereby the cartridge and soundtrack are designated by remote control to reproduce the soundtrack of the indexed cartridge.

6. A tape player utilizing a plurality of endless magnetic tape cartridges set forth in claim 1 wherein said soundtrack changeover means includes a rotary switch having a rotor, said rotor being coupled to the cam plate shaft, the rotary switch having electrical contacts adapted to be opened and closed in response to movement of the second armature of the second electromagnetic plunger, the number of contacts of said rotary switch corresponding to the number of soundtracks of the magnetic tape, each contact of the rotary switch being connected in series with a group of switches of said control circuit, said contacts of said rotary switch further being connected in series with the current supply circuit to said second electromagnetic plunger for breaking off current whenever the electromagnetic plunger is energized.

7. A tape player utilizing a plurality of endless magnetic tape cartridges according to claim 6, wherein each switch of said group of switches of said control circuit is a microswitch having a normally closed type of contact and normally opened type of contact, said normally closed type of contact being connected in series with a contact opposed to the rotary switch of said soundtrack changeover means while said normally opened type of contact is connected in parallel with each other and provided in the current supply circuit of the electromagnet of said tape driving and reproducing deck.

8. A tape player utilizing a plurality of endless magnetic tape cartridges set forth in claim 1 wherein said means for rotating the container includes a roller adapted to be engaged by said capstan, a belt wheel rotatable with said roller, another belt wheel integrally formed in said container, and a belt extending between said two belt wheels.

9. A tape player utilizing a plurality of endless magnetic tape cartridges set forth in claim 8 wherein said engaging portions are bights on said disc, and projections are provided between the bights, a second electrical contact adapted to be closed by said engagement thereof with said projections is arranged in the path of rotation of said disc, and said second electrical contact is connected in series with said electrical contact of said cartridge and soundtrack-indexing means such that rotation of the container synchronously with said index plate is controlled under cooperation of said two contacts.

10. A tape player utilizing a plurality of cartridges each containing a pinch roller and an endless magnetic tape, in which the cartridge and soundtrack are indexed by depressing a pushbutton rod and in which selected cartridges are successively played, comprising: a rotatable and slidable container for housing a plurality of said cartridges; cartridge-selecting means including an armature, a first electromagnetic plunger for operating said armature, a disc rotatable in synchronism with said container having a plurality of engaging portions corresponding to the cartridges housed in said container, said armature being positioned to engage one of said engaging portions to terminate rotation of the container and to bring the cartridge associated with said engaged engaging portion into a predetermined play position; a tape driving and reproducing apparatus including a magnetic head, an end mark sensor and a capstan adapted to be disposed to the leading edge of the cartridge positioned in the play position by said cartridge-selecting means; means for rotating said container including a roller engageable with a portion of said container and a transmission for member imparting rotating power of said capstan to said roller; means for sliding said container including a rotatable member pivoted at one end and adapted to engage said container with the other end, a cam and a transmission member for imparting rotation of said capstan to said cam, said rotating member being swingable under control of the cam to slide said container to a position adjacent said tape driving and reproducing apparatus, and a spring urging said container in a direction remote from said tape driving and reproducing apparatus; container-attracting means including an electromagnet for magnetically attracting the container when the container is slidably moved by said container-sliding means to said position and for maintaining abutment of the pinch roller of the cartridge positioned in the play position with the capstan and of the magnetic head and the end mark sensor with the tape; soundtrack changeover means for selectively vertically moving said magnetic head to the desired one of a plurality of soundtracks, including a second armature, a second electromagnetic plunger for moving said second armature, a cam plate adapted to be rotatably driven in response to movement of the armature of the second electromagnetic plunger; cartridge and soundtrack-indexing means including a rotatable index plate, means for rotating said index plate, and a plurality of groups of pushbutton rods mounted on said index plate, each group corresponding to one of the plurality of cartridges housed in said container and the number of pushbutton rods in each group corresponding to the number of soundtracks on a tape in a cartridge, each of said pushbutton rods being independently slidable between a normal raised position and a depressed indexing position, an electrical contact adapted to be operatively opened and closed synchronously with rotation of said index plate, the first electromagnetic plunger being adapted to be energized and controlled in response to opening or closing of said electrical contact, whereby said container is rotated synchronously with rotation of said index plate; pushbutton-rod-returning means including an arresting member provided in the path of rotation of a depressed pushbutton rod for arresting rotation of the index plate by engagement by said arresting member and a depressed pushbutton rod, a third electromagnetic plunger, a pushbutton-rod-returning member for moving a depressed pushbutton rod engaged with said arresting member out of engagement therewith and to return said depressed rod to its normal raised position, said pushbutton rod return member being actuated by said third electromagnetic plunger when said third electromagnetic plunger is energized, and said third electromagnetic plunger being adapted to be energized in response to detection of an end mark on the magnetic tape by said end mark sensor, a control circuit for controlling current supply to the electromagnet of said container-attracting means and to the second electromagnetic plunger including a group of switches operable by a depressed pushbutton rod engaging and being disengaged from said arresting member, said means for rotating said container and said means for rotating said index plate being operable independent of said pushbutton rod return means.